United States Patent [19]

Upmeier

[11] 3,802,825
[45] Apr. 9, 1974

[54] EXTRUDER FOR PLASTIC MATERIAL HAVING A FLOW DIVIDER AND MEANS FOR MAINTAINING THE SAME DISTRIBUTION OF TEMPERATURE GRADIENTS IN THE DIVIDED FLOW

[75] Inventor: Hartmut Upmeier, Tecklenburg, Germany

[73] Assignee: Windmoller & Holscher, Lengerich, Germany

[22] Filed: Sept. 22, 1972

[21] Appl. No.: 291,377

Related U.S. Application Data

[63] Continuation of Ser. No. 87,081, Nov. 5, 1970, abandoned.

[30] Foreign Application Priority Data

Nov. 11, 1969 Germany ....................... 1956652

[52] U.S. Cl. ............................ 425/378, 137/561 A
[51] Int. Cl. ................................................ B29f 3/08
[58] Field of Search ............ 425/238, 376, DIG. 49, 425/461, 378; 137/561 A, 561 R

[56] References Cited
UNITED STATES PATENTS

| 3,406,699 | 10/1968 | Fischer | 137/561 R |
| 3,393,730 | 8/1968 | Menneson | 137/561 R |
| 3,404,432 | 10/1968 | White et al. | 425/113 |
| 3,531,828 | 10/1970 | Nauta | 425/131 |

*Primary Examiner*—R. Spencer Annear
*Attorney, Agent, or Firm*—Fleit, Gipple & Jacobson

[57] ABSTRACT

An extruder for plastic material, especially thermoplastic or non-cross-linked elastomeric material, comprises a main feed passage for the plastic material, branch feed passages leading to respective extrusion dies, and a flow divider interposed between said main and branch feed passages. The flow divider is provided with a plurality of laminar channels which are disposed in parallel planes and which have their inlets located in the main feed passage and their outlets opening alternately into a respective branch passage.

6 Claims, 2 Drawing Figures

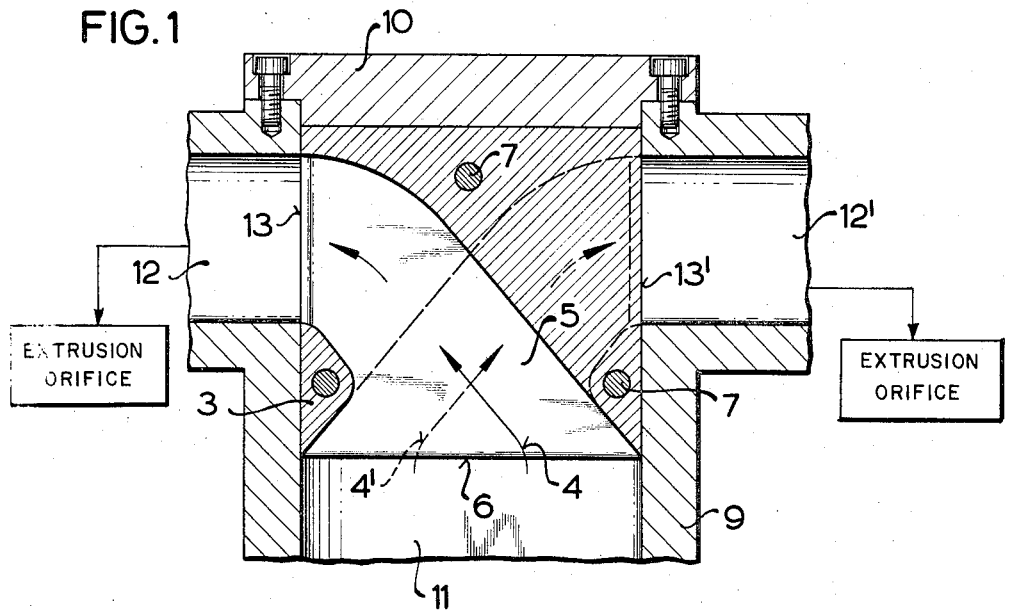
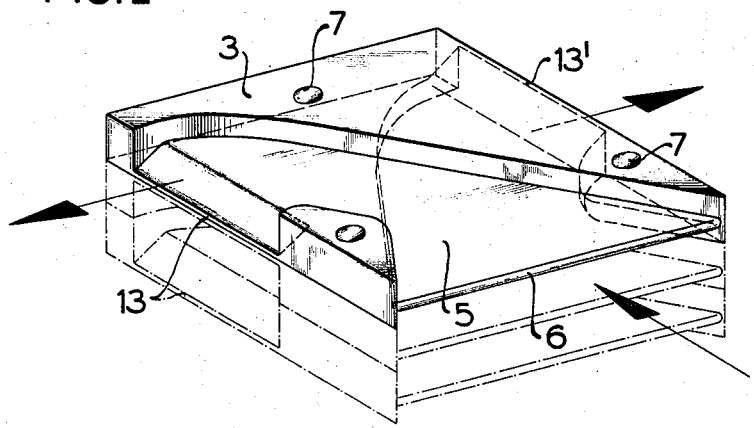

EXTRUDER FOR PLASTIC MATERIAL HAVING A FLOW DIVIDER AND MEANS FOR MAINTAINING THE SAME DISTRIBUTION OF TEMPERATURE GRADIENTS IN THE DIVIDED FLOW

This application is a continuation of application Ser. No. 87,081, filed Nov. 5, 1970, for Extruder for Plastic Material, Especially Thermoplastic or Non-Cross-Linked Elastomeric Material, now abandoned.

The invention relates to an extruder for plastic material, especially thermoplastic or non-cross-linked elastormeric material, in which the feed passage for the material comprises a flow divider for distributing the material into two or more branch passages leading to extrusion dies.

In known such extruders, various irregularities occur in the feed passage leading to the extrusion die or dies. These are primarily temperature errors, namely the so-called axial temperature errors which fluctuate with time and the so-called radial temperature errors that give rise to different temperatures over the cross-section of the passage. If a flow divider is now used to divide the original single stream of plastic material into two part streams by means of a blade-like baffle plate which leads the part streams into the branch passages, then the radial temperature errors will be unsymmetrically distributed in the two branch passages because the plastic material which is disposed at the centre of the stream in the main feed passage and which is generally hotter than the material flowing near the walls of the passage will be located at one side of each branch passage whilst the cooler material will flow along the other side of the branch passages. Such unsymmetrical temperature distribution gives rise to particularly disturbing effects at the two extrusion dies and these effects are even more disruptive if the temperature distribution over the cross-section of the main feed passage is already unsymmetrical to begin with.

The invention aims to make it possible to retain in the branch passages the same radial temperature differences that occur in the main feed passage or in other words to retain in the branch passages the same symmetrical distribution of temperature differences that usually occurs in the main feed passage.

According to the invention, an extruder for plastic material, especially thermoplastic or non-cross-linked elastormeric material, comprises a main feed passage for the plastic material, branch feed passages leading to respective extrusion dies and a flow divider interposed between said main and branch feed passages, the flow divider being provided with a plurality of laminar channels which are disposed in parallel planes and which have their inlets located in the main feed passage and their outlets opening alternately into a respective branch passage. Since the inlets of the laminar channels extend over the entire cross-section of the main feed passage, the same temperature distribution as occurs in the main feed passage will be present in the layer of plastic material that is moving along each laminar channel and thus the symmetrical distribution of the radial temperature differences that is present in the main passage will also occur in the branch passages, thereby avoiding the difficulties created by the unsymmetrical distribution in prior constructions. If desired, further evening out of the temperature differences in the individual branch passages can be achieved by means of a mixer which is the subject of one of our previous patent applications and in which the flow is divided into a plurality of parallel flat laminar flows which are alternately led past one another crosswise to equalise the different temperatures along the principle of the cross-flow heat exchanger.

In a preferred form of the invention, the laminar channels are formed between superposed and interconnected plate-like elements. To facilitate streamline flow, these plates are of blade form at the inlets and outlets of the laminar channels. The channels may be milled into the plates leaving thin dividing walls between them. Preferably, each plate is provided with a milled channel in each face, the outlets of the channels in any one plate pointing in opposite directions. In this construction, the plates will be identical and care need only be taken when superposing the plates to ensure that the direction of the upper channel in a plate is the same as the direction of the lower channel of the plate immediately above it, whereby these upper and lower channels together form a laminar channel.

One example of the invention will now be described with reference to the accompanying drawing, wherein:

FIG. 1 is an axial section through a flow divider in an extruder, and

FIG. 2 is a perspective view of the flow divider of FIG. 1.

Interposed between a main feed passage 11 and branch passages 12, 12' of an extruder that is closed by a cover 10, there is a flow divider insert constructed from milled plates 3. As will be evident from FIG. 2, each plate 3 has channels milled into its upper and lower face, these channels leading out of the flow divider insert in opposite directions. The plates 3 are so superposed and fixed in position by means of pins 7 that the upper channel of a plate will be aligned with the lower channel of a superposed plate so that the channels together form a laminar channel. At the inlets of the laminar channels which extend over the entire width of the main feed passage 11, flow divider blades 6 are formed. Similarly, flow-off blades 13, 13' are provided at the outlets. In the region 5 where the channels in the upper and lower faces overlap, the separating walls left after milling the channels are comparatively thin. In this region, therefore, where the laminar channels 4, 4' partially intersect, there will be partial evening out of the temperatures on the principle of the cross-flow heat exchanger.

Dispensing with complete cross-flow in the region 5 is balanced out in that temperature errors are retained in their position of axial symmetry, i.e., in that the same temperature distribution occurs in the branch passages 12, 12' leading out of the flow divider 9 as is present in the main feed passage 11. Evening out of the radial temperature differences can be effected immediately in front of the extrusion dies by means of mixers inserted in the branch passages 12, 12' in the manner of the aforementioned previous patent application. On the other hand, if temperature equalisation is to be completed within the flow divider 9, then the inlet of each laminar passage 4 or 4' must extend across only half the width of the feed passage 11 and the laminar passages must be so positioned in an alternate arrangement that the flow layers in the central region (where heat exchange windows with or without partitions having a good heat conductivity are provided between the individual laminar channels) are led fully crosswise past one another.

The construction according to the invention is also applicable to flow divider inserts which divide the plastic material into three or more branch passages.

I claim:

1. In an extruder for plastic material, especially thermoplastic or non-cross-linked elastomeric material, comprising a main feed passage for the plastic material, branch feed passages branching from said main feed passage and a flow divider interposed between said main and branch feed passages, the improvement comprising providing the flow divider with a plurality of planar channels which are disposed in parallel planes and which have their inlets located in the main feed passage and their outlets opening alternately into respective branch passages and wherein each of said inlets extends completely across the feed passage in the direction of said parallel planes.

2. An extruder according to claim 1 wherein the inlet and outlet openings of each planar channel communicate with each other by a single channel.

3. An extruder according to claim 1, wherein the laminar channels are formed between superposed and interconnected plates.

4. An extruder according to claim 3, wherein the plates are of blade form at the inlets and outlets of the laminar channels.

5. An extruder according to claim 3, wherein the laminar channels are milled into the plates leaving thin dividing walls between them.

6. An extruder according to claim 5, wherein each plate is provided with a milled channel in each face, the outlets of the channels in any one plate pointing in opposite directions.

* * * * *